July 26, 1960

J. FÄRBER 2,946,480

STACKING MECHANISM FOR RECEIVING STACKS
OF NESTED CONTAINERS AND INDIVIDUALLY
DELIVERING THE SAME

Filed Aug. 17, 1956

Inventor
J. Färber
By Glascock Downing Luebke
Attys.

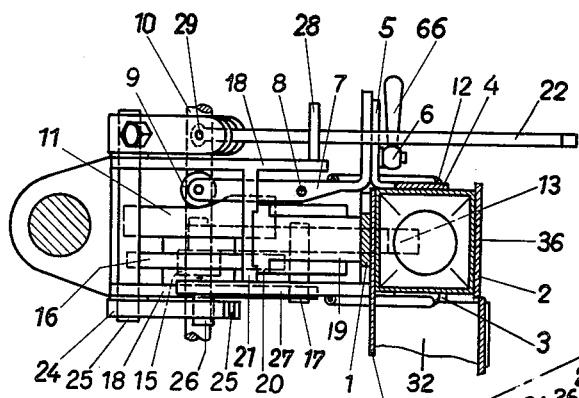
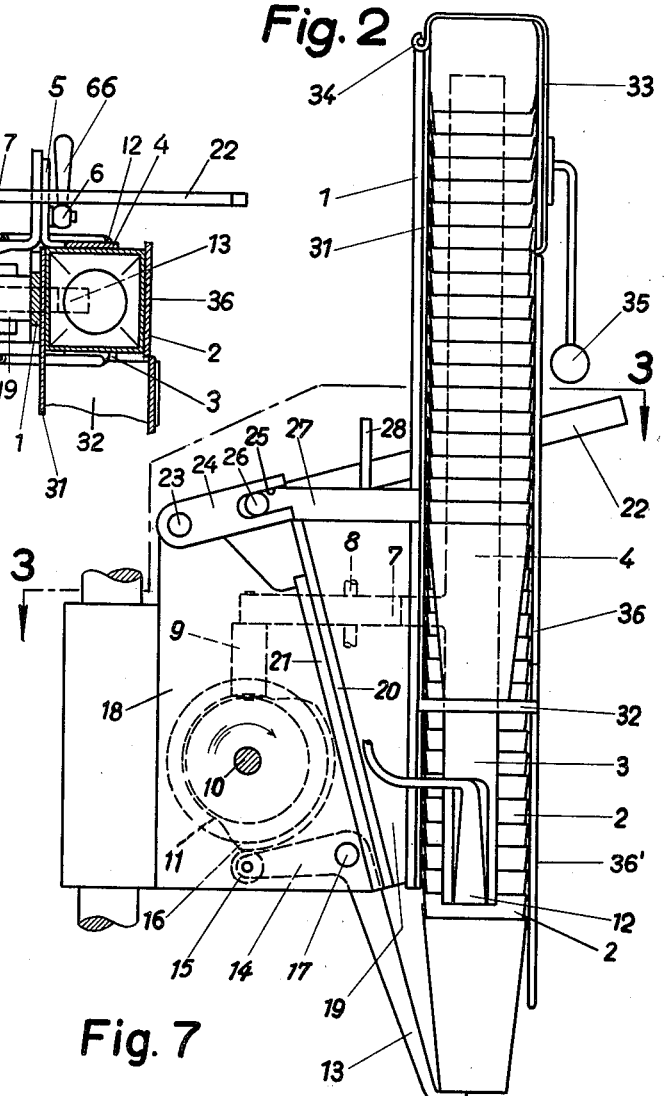
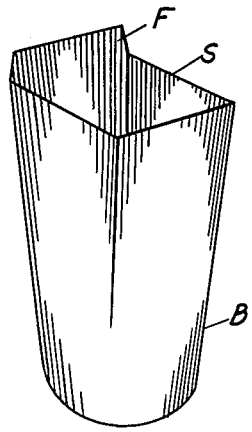
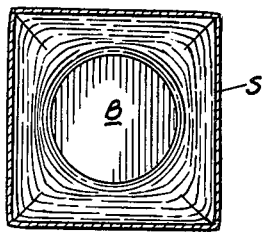
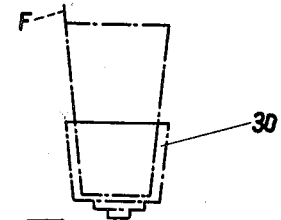

July 26, 1960

J. FÄRBER 2,946,480

STACKING MECHANISM FOR RECEIVING STACKS
OF NESTED CONTAINERS AND INDIVIDUALLY
DELIVERING THE SAME

Filed Aug. 17, 1956

Inventor
J. Färber
By Glascock Downing Seebold
Attys.

United States Patent Office 2,946,480
Patented July 26, 1960

2,946,480

STACKING MECHANISM FOR RECEIVING STACKS OF NESTED CONTAINERS AND INDIVIDUALLY DELIVERING THE SAME

Jurgen Farber, Dusseldorf, Germany, assignor to Jagenberg-Werke Akt.-Ges., Dusseldorf, Germany Filed Aug. 17, 1956, Ser. No. 604,640

Claims priority, application Germany Sept. 3, 1955

5 Claims. (Cl. 221—106)

The present invention relates to the art of handling containers that are made of paper, cardboard or the like carton-forming material.

More particularly, this invention relates to the handling of such containers of conical shape and in the form of stacks of nested containers.

Still more particularly this invention relates to a stacking mechanism for receiving stacks of nested containers and individually delivering the same.

The invention further relates to such a stacking mechanism which delivers individual containers to a cell-type conveying mechanism moving below the stacking mechanism and which conveying mechanism transfers the delivered containers to a processing machine, for example at a filling station.

In the production and processing of containers of flexible material of the type in question, it is necessary to adapt the various handling or processing mechanism and the conveying means associated therewith for different container sizes and cross sections. In effecting such adaptation, it is desirous to effect changes from one container size to another by the simplest means and by involving as few manipulations as possible. In systems including conveying installations that move containers to be processed or filled to several stations, the construction and arrangement of the processing and filling mechanisms renders it desirable to effect adjustment from one container size to the other by making a concentric adjustment of the conveying devices or cells so that a median line that is uniform for all containers sizes and cross sections is provided along which the advance or feed of the containers occurs.

This median line which is unchanged for all containers of a size within the adjusting range renders it necessary to adapt the supply stack from which the containers are individually delivered to the conveyers, in conformity with this median line of travel and in accordance with the size of the container being handled.

In stacking mechanisms in which are accommodated a stack of nested containers and which includes a main wall that is fixed with respect to the arrangements carrying the stacking mechanism and on which wall are arranged adjustable strips for guiding the movement of the stack, it is required that in the necessary height adjustment to adapt the mechanism to handle different sized containers to also adapt the position of the stack mechanism so that with the change in container cross section size an adjusting motion perpendicular to the height adjusting motion is effected. This is to assure that the longitudinal median line of the containers housed in the stacking mechanism in each phase of adjustment remains aligned with the median line of the cell conveyer that is movable below the stacking mechanism.

Heretofore, in effecting the longitudinal and transverse adjustment of the stacking mechanism, two separate and individually accommodated adjusting mechanisms were utilized. With such arrangement, disregarding the attendant increase in expenditure for structural arrangements, the adjustment was difficult and time consuming.

Accordingly, the present invention has for an object to simplify the structure and manipulation of the stacking mechanism to provide an arrangement incorporating fewer parts and thus of decreased costs. More specifically the invention has for an object to provide a stacking mechanism incorporating means for effecting adjustment of the stack as to height relative to a conveying mechanism, constructed and arranged to simultaneously effect adjustment of the stack in a direction perpendicular to the height adjustment so that the longitudinal median line of all containers regardless of cross-section size and lying within the adjusting range of the stacker mechanism occupies a concentric position with respect to the conveyer mechanism arranged below the delivery end of the stacking mechanism. Specifically, therefore, the invention has for an object to provide a stacking mechanism in which the supporting arrangements for the stack of nested containers is displaceably guided along a guide that is arranged at an acute angle to the longitudinal axis of the stack.

In effecting adjustment of the stacking mechanism, the invention provides a single hand operated lever swingable about a fixed point and movable in a plane transverse to the direction of swing and guided by a slotted plate having lever accommodating notches therein arranged to determine the adjusting movement of the stacker in accordance with a selected group of container cross-section sizes so that by actuation of this single lever the stacking mechanism is adjusted as to height and transverse position with regard to the cell conveyer passing beneath the stacking mechanism.

Further, in order to avoid interruptions during the operation, the invention provides as an adjunct to the container dispensing portion of the stacking mechanism a stack supply structure accommodating a plurality of stacks of nested containers in such fashion that any adjustment of the dispensing portion effects simultaneous adjusting movement of the structure accommodating the additional stacks.

Further and more specific objects will be apparent from the following description taken in connection with the accompanying drawings in which:

Figure 2 is a side view of the arrangement shown in Figure 1.

Figure 3 is a cross sectional view taken along line 3—3 of Figure 2.

Figure 4:
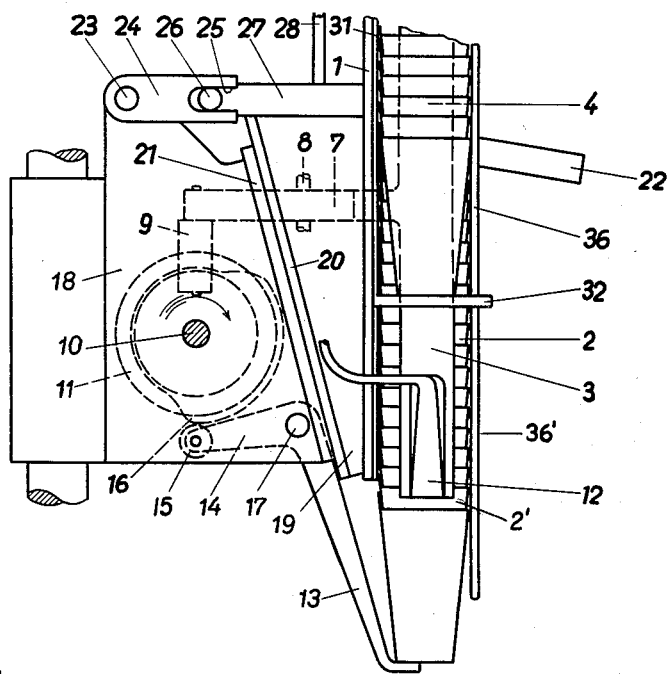
Figure 5:
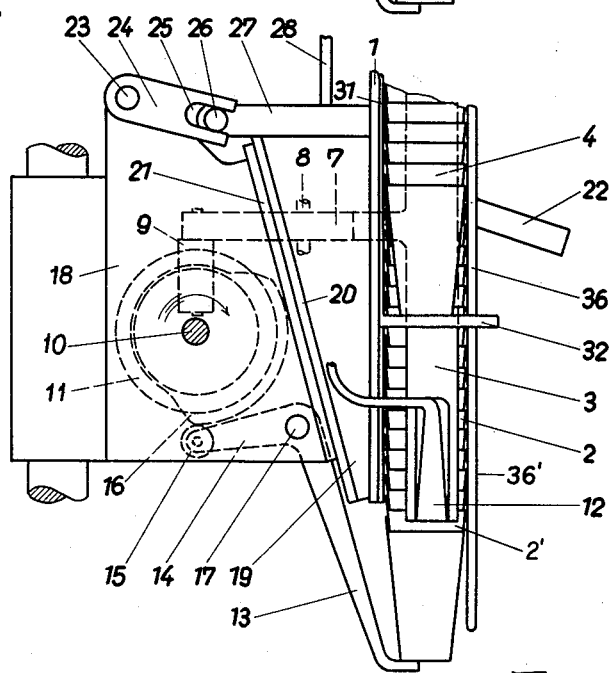

Figures 4 and 5 in connection with Figure 2 show the various positions of the stacking mechanism for 3 different container sizes.

Figures 6 and 7 are respectively a perspective view and a horizontal cross section on an enlarged scale through the upper part of a container of the type handled by the stacking mechanism of this invention.

Figure 1:
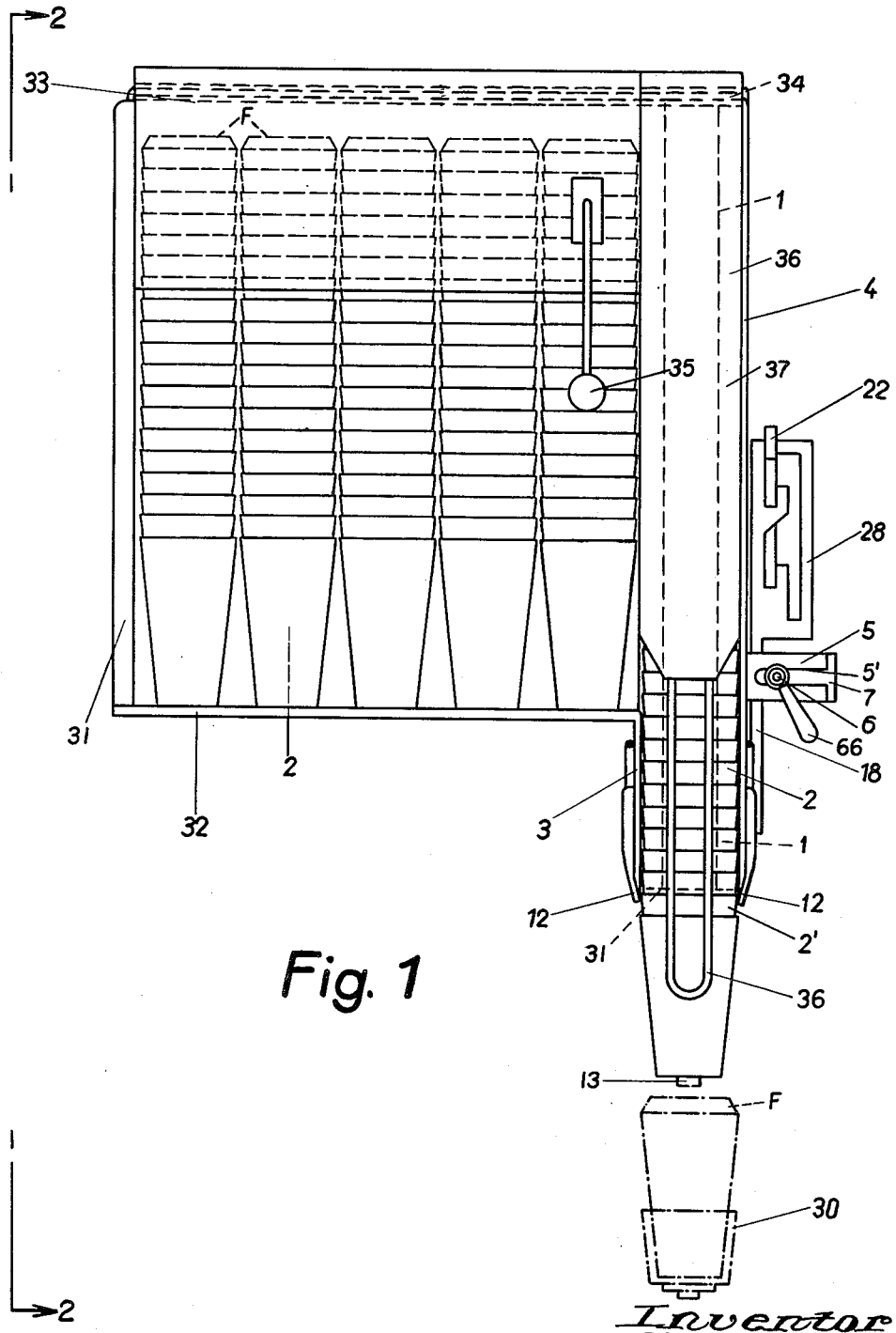
Figure 1 is a front view of the stacking mechanism.

The stacking mechanism illustrated in the drawings includes a main or rear plate 1 which constitutes a guide for the rear part of the stack 2. The side guides for confining the stack during discharge includes a stationary side wall 3 and a movable brake rail 4 oposite the wall 3. The brake rail 4 is provided with a lateral extension 5 which as is clear from Figure 1 is provided with a slot. The rear face of the extension 5 bears against a laterally extending arm of a lever 7. A bolt member 6 projects outwards from the face of lever 7 and passes through the slot 5' in the extension 5. A handle member 66 which operates as a clamp cooperates with the threads on the bolt member 6 to bear against the front face of extension 5 and clamp its rear face against the extension of lever 7. It is believed clear that by turning the handle 66, extension 5 and thus the brake rail can be shifted laterally of the axis of the containers so as to permit a changeover to different container sizes.

This lever 7 pivoting on the fixed pin 8 is provided on its free end with a follower roller 9 which co-operates with cam 11 mounted on the shaft 10. The lower end of the brake rail 4 has mounted thereon a compressed air emitting nozzle 12 which, when the brake rail is moved into position to engage the stack 2, has its outlet end disposed to depress the wall of the container 2' next to the end container so that an air jet issuing from the nozzle can pass into the space between the interior of the end container and the exterior of the next adjacent container to blow the end container from the stack. Figures 6 and 7 illustrate that each container has a generally square upper end S that tapers downwardly and merges into a round bottom portion B. A flap F extends upwards from one of the upper edges of the container body. A container of this general type is shown in U.S. Patent 2,344,359 to Lehmann. Another air nozzle 12' is mounted on the stationary rail 3. The arrangement being such that by operating lever 7 through cam 11 the brake rail 4 is released and the stack can drop so that the end container engages the stop member 13, whereupon the brake rail 4 and nozzle 12 are moved to stack engaging position, the stop member 13 is moved out of the line of movement of the stack, the air blast then effecting delivery of the end container. The stop member 13 is operated by the lever arm 14 whose follower roller 15 co-operates with a cam 16 fixed to shaft 10. The pivot 17 of lever 14 is mounted in the fixed holding structure or frame 18.

The operation of these components is set forth in prior Patent 2,734,657 issued February 14, 1956 to the assignee of the present invention and entitled, "Method And Apparatus For Handling Containers Made of Flexible Material Such as Paper Cardboard and the like," and in application Serial No. 604,722 filed in my name on August 17, 1956, and entitled, "Apparatus For Separating Nested Containers Made of Paper, Cardboard or the like Carton Forming Material", now abandoned.

To effect the adjustment of the container discharging end of the stacking mechanism, there is provided a metallic web 19 extending rearwardly from the rear plate 1. On the end of the web 19 remote from plate 1 is a slide component 20 that extends at an acute angle to the longitudinal axis of the stack and plate 1 and also upwardly and outwardly with respect to the underlying cell conveyor. The slide component 20 is movable along a guideway or slideway 21 disposed at a similar angle to the longitudinal axis of the stack. This slideway 21 forms part of the fixed holding structure or frame 18. In order to effect adjusting movement of the stack accommodating mechanism there is included a manipulating lever 22 fixed to one end of a pivot shaft 23 which is located in the holding structure 18. On the other end of this shaft 23 is fixed a lever 24 having an inwardly extending slot 25 in its free end that accommodates a pin or bolt 26 carried by a bracket 27 that is connected to rear plate 1. The free end of lever 22 is movable in the cut out portion of a notched plate 28 which is fixed to holding structure 18 and which is provided with lever accommodating notches in correspondence with the different container sizes. The lever 22 is designed as a two-part-joint lever which makes possible a lateral movement and a hinging of the handle on pin 29.

By actuating lever 22, due to the slanting arrangement of slidway 21 there is obtained a lateral displacement of stacker which is in addition to the desired height adjustment so that vertical size and cross-sectional size of the container in the stack are adjusted in relation to the median line of the cell conveyor 30 arranged below the discharge end of the stack.

As is apparent in Figure 3, the rear plate 1 is by and connected to a back plate or rear wall 31 which is extended laterally to the left and against which rests a plurality of stacks 2. From the lower portion of this extension extends a foot piece 32 on which the stacks rest. The wall 3 depends from the right-hand end of this foot piece or base 32. In order to secure the additional stacks in position a door is secured by hinge means 34 along the top of extension 31. The door portion 33 is actuated by a handle 35. At the right hand side, as viewed in Figure 1, door 36 includes a depending extension which overlies the stack being delivered and a depending bail member 36' is secured to this extension to thereby hold the stack being delivered in proper position. With this arrangement, it is clear that ready access to all stacks is attained by swinging the door structure upwardly. It is further clear that as one stack is discharged the next stack can be moved laterally into position. The side guide 3 is formed by a depending end portion of the end plate 32.

What is claimed is:

1. Stacking mechanism for accommodating and holding stacks of containers at least a major length of which are conical and for delivering individual containers from the stack to a cell conveyor underlying the mechanism and in spaced relation thereto, said mechanism comprising stack supporting means for accommodating and holding a stack of nested containers in vertical position, mechanism for individually delivering the end container of the stack to an underlying cell of the conveyor, adjustable mounting means for said stack supporting means including a slideway extending at an acute angle to the longitudinal axis of the stack and upwardly and laterally outwardly with respect to the path of travel of the underlying conveying mechanism, a slide on said slideway and connected to said stack supporting means, an adjusting means for moving said slide and thus said stack supporting means on said slideway when the cross sectional size of the containers of a supported stack is varied so that the longitudinal median line of a supported stack is simultaneously moved vertically and transversely to be disposed concentrically of the underlying cell of the cell conveyor, said adjusting means including a pivot means, a lever means connected to said pivot means, means connected between said pivot means and said stack supporting means whereby movement of the lever means moves the slide and thus the supporting means along the slideway and a slotted plate having lever accommodating notches therein limiting the movement of the lever means to positions in which the slide can be adjusted in accordance with different cross-sectional size of the sized containers of the supported stack.

2. Stacking mechanism for accommodating and holding stacks of containers at least a major length of which are conical and for delivering individual containers from the stack to a cell conveyor underlying the mechanism and in spaced relation thereto, said mechanism comprising stack supporting means for accommodating and holding a stack of nested containers in vertical position, said supporting means including a fixed rear wall, stack contacting means extending perpendicular to said wall, fixed with respect thereto and disposed to engage at least the lower portion of the stack, an adjustable side wall means opposite such stack contacting means and adjustable toward and away from the same so as to engage and contact the adjacent side of stacks of different cross sectional size and a movable stack contacting means opposite said rear wall and movable toward and away therefrom as the cross sectional size of an accommodated stack is varied so as to hold the stack against said rear wall, mechanism for individually delivering the end container from an accommodated stack to the underlying cell of the cell conveyor and mounting means for the supporting means including means for simultaneously vertically and transversely adjusting the position of the rear wall so as to maintain the longitudinal median line of the stacks of varying cross sectional size containers concentric with the underlying cell of the conveyor.

3. Stacking mechanism for accommodating and holding stacks of containers at least a major length of which are conical and for delivering individual containers from the stack to a cell conveyor underlying the mechanism and in spaced relation thereto, said mechanism comprising stack supporting means for accommodating and holding a stack of nested containers in vertical position, mechanism for individually delivering the end container of the stack to an underlying cell of the conveyor, adjustable mounting means for said stack supporting means including a slideway extending at an acute angle to the longitudinal axis of the stack and upwardly and laterally outwardly with respect to the path of travel of the underlying conveying mechanism, a slide on said slideway and connected to said stack supporting means, an adjusting means for moving said slide and thus said stack supporting means on said slideway when the cross sectional size of the containers of a supported stack is varied so that the longitudinal median line of a supported stack is simultaneously moved vertically and transversely to be disposed concentrically of the underlying cell of the cell conveyor.

4. Stacking mechanism as claimed in claim 3 in which the stack supporting means further includes a lateral extension and means connected to the extension for supporting a plurality of stacks of nested containers and said extension being movable with the stack supporting means when the latter is adjusted.

5. Stacking mechanism for accommodating and holding stacks of containers at least a major length of which are conical and for delivering individual containers from the stack to a cell conveyor underlying the mechanism and its spaced relation thereto, a frame disposed above and to one side of the conveyor, a slideway on said frame extending at an acute angle upwardly and laterally outwardly with respect to the path of travel of the underlying conveyor, a slide for cooperation with said slideway, stack supporting means for accommodating and holding a stack of nested conical containers in vertical position and including at least a rear wall fixed to said slide, stack contacting means extending perpendicular to said rear wall, fixed relative thereto and having a length to engage one side of the stack at least adjacent the lower end thereof, an adjustable side wall means opposite said stack contacting means and movable toward and away therefrom so as to accommodate and engage the sides of stacks of containers of a varying cross-sectional size and a movable stack contacting means spaced from and opposite said rear wall and movable toward and away therefrom as the cross-sectional size of the containers in an accommodated stack is varied so as to hold such stack against said rear wall, mechanism for individually delivering the end container from the stack, and means for moving the slide along the slideway and for holding the slide in different selective positions corresponding to stacks of containers having different cross-sectional sizes so that the longitudinal median line of the supported stack is simultaneously moved vertically and transversely distances sufficient to maintain the median line of the containers in stacks of different cross-sectional size containers concentrically of the underlying cell of the cell conveyor.

References Cited in the file of this patent

UNITED STATES PATENTS

| | | | |
|---|---|---|---|
| 402,170 | Leeds | Apr. 30, | 1889 |
| 526,198 | Pringle et al. | Sept. 18, | 1894 |
| 1,070,163 | Morgan | Aug. 12, | 1913 |
| 1,688,510 | Taylor | Oct. 23, | 1928 |
| 1,837,765 | Dunkley | Dec. 22, | 1931 |
| 2,023,401 | Block | Dec. 10, | 1935 |
| 2,195,942 | Stonestreet | Apr. 2, | 1940 |
| 2,304,146 | Brinton | Dec. 8, | 1942 |
| 2,332,156 | Long | Oct. 19, | 1943 |
| 2,667,420 | Meulemans et al. | Jan. 26, | 1954 |
| 2,734,657 | Drese | Feb. 14, | 1956 |
| 2,738,899 | Hansen et al. | Mar. 20, | 1956 |
| 2,744,672 | Crist | May 8, | 1956 |